Aug. 4, 1925.

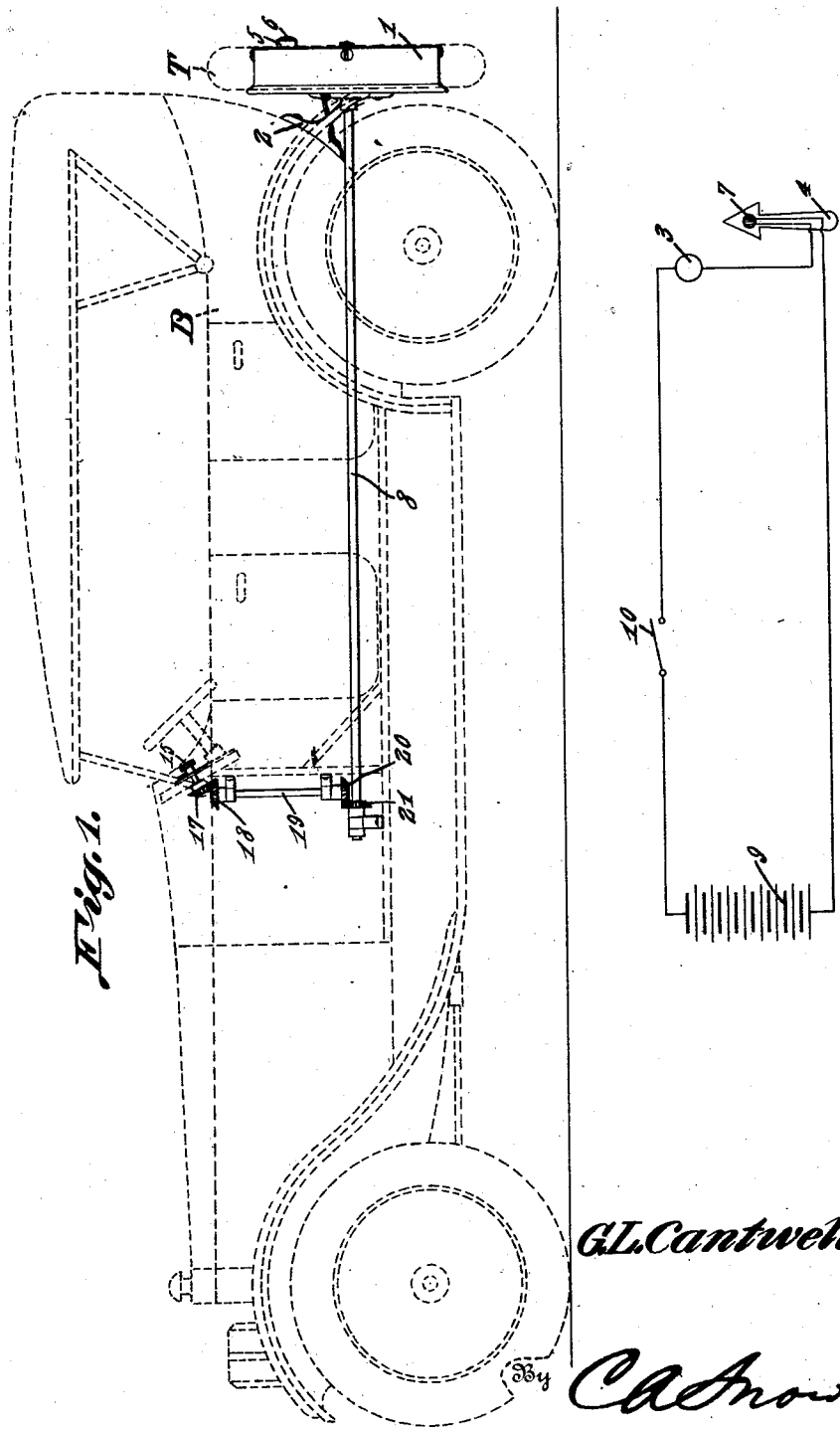

G. L. CANTWELL

AUTO SIGNAL

Filed Aug. 19, 1924

G. L. Cantwell, Inventor

By C. A. Snow & Co.
Attorneys

Patented Aug. 4, 1925.

1,548,115

UNITED STATES PATENT OFFICE.

GEORGE L. CANTWELL, OF WICHITA, KANSAS.

AUTO SIGNAL.

Application filed August 19, 1924. Serial No. 732,972.

*To all whom it may concern:*

Be it known that I, GEORGE L. CANTWELL, a citizen of the United States, residing at Wichita, in the county of Sedgwick and State of Kansas, have invented a new and useful Auto Signal, of which the following is a specification.

This invention relates to a combined direction signal, tail light and tire holder for use upon the back of an automobile body, one of the objects of the invention being to provide a simple and efficient structure of this character which can be mounted readily upon an automobile and can not only be used as a means for holding a spare tire, but also constitutes the housing of the direction signal and the support for the tail light.

A further object is to provide simple mechanism whereby the direction signal can be actuated readily from the dash by the driver.

With the foregoing and other objects in view which will appear as the description proceeds, the invention resides in the combination and arrangement of parts and in the details of construction hereinafter described and claimed, it being understood that changes in the precise embodiment of the invention herein described and claimed may be made within the scope of what is claimed without departing from the spirit of the invention.

In the accompanying drawings the preferred form of the invention has been shown.

In said drawing—

Figure 1 is a view showing the direction signal and tire holder in position on an automobile, the vehicle being outlined in broken lines.

Fig. 2 is a diagram showing the lighting circuit of the apparatus.

Figure 4:
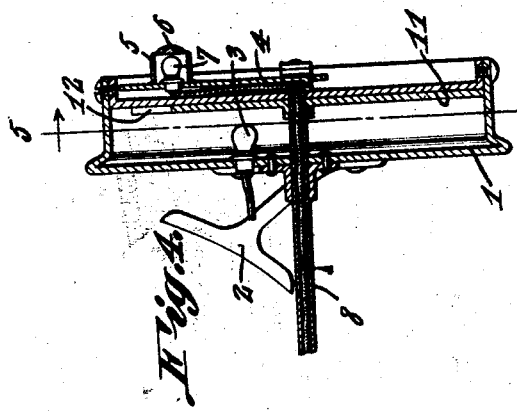
Fig. 4 is a section on line 4—4, Fig. 3.
Figure 6:
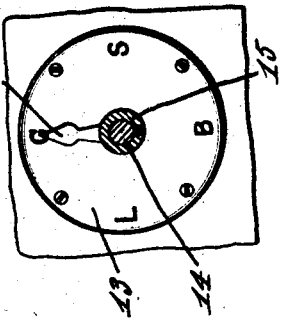
Fig. 6 is a section through the operating means located on the dash.

Referring to the figures by characters of reference 1 designates a circular housing so proportioned as to fit snugly within the frame of the spare tire T. This housing is adapted to be connected to the back end of the vehicle body B by any suitable means such as a bracket 2. Located in the housing 1 is a lamp 3 and pivotally mounted upon the center of the rear or exposed face of the housing is a hand or pointer 4 carrying a lamp housing 5 on the end portion thereof. This housing is preferably provided with a colored lens 6 and a lamp 7 is arranged in the housing 5. The hand or pointer is secured to a tubular shaft 8 mounted for rotation in the housing 1 and both the lamps 3 and 7 are in circuit with a battery 9 or other source of electrical current. A suitable switch 10, which can be located on the dash, is provided for closing and opening the circuit.

Figure 3:
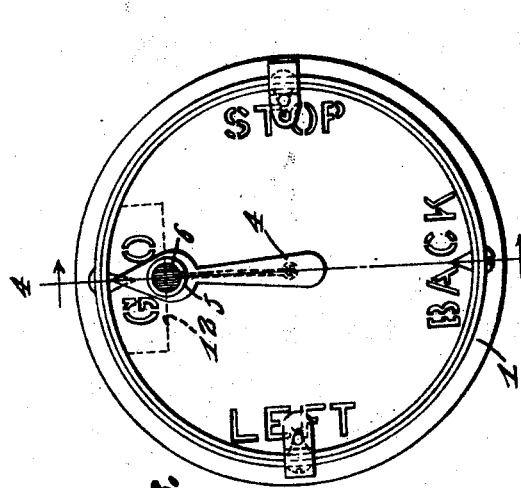
Fig. 3 is a rear elevation of the combined direction signal and tire.
Figure 5:
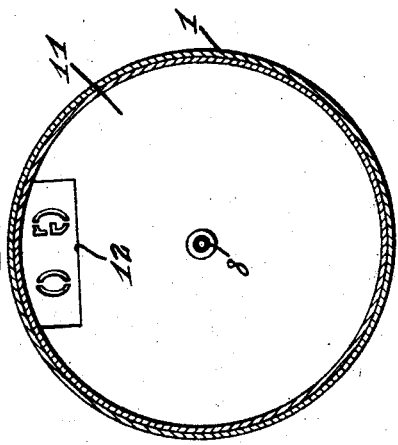
Fig. 5 is a section on line 5—5, Fig. 4.

As shown in Fig. 4 the wires leading to the lamp 7 can be housed within the shaft 8. The rear or exposed face of the housing 1 is preferably provided with cut out letters forming the words "Go", "Left", "Stop" and "Back". In the arrangement shown in Fig. 3 the words "Go" and "Back" are located adjacent the top and bottom respectively of the housing while the words "Left" and "Stop" are located at the left and right sides of the housing respectively. If desired a disk 11 can be secured to the shaft 8 and rotates within the housing 1 close to or in contact with the back face of the rear or exposed wall of the housing. This disk has a cut out portion 12 in its periphery so that when the hand or pintle 4 is extended toward any one of the words cut in the housing, the cut away portion of the shield or disk 11 will be located back of said word so that light rays will be free to pass through the cut out letters. At the same time the flow of light to the other words will be cut off as will be apparent.

A dial 13 may be mounted on the dash or at any suitable point in the vehicle, this dial having suitable indicating means such as the letters "G", "L", "S" and "B" arranged in the same relative positions as the words cut into the housing 1.

A shaft 14 is journaled in the center of the disk and has a knob 15 whereby it can be rotated readily. Extending from the knob is a pointer or index 13 and by rotating the knob, this index can be brought to position to indicate any one of the letters. Shaft 14 has a gear 17 secured thereto and meshing with another gear 18. This latter gear is secured to a shaft 19 and motion is adapted to be transmitted from said shaft through gears 20 and 21 to the shaft 8. Thus it will be seen that by rotating the knob the disk or shield 11 and the hand or pointer 4 will also be rotated and when the index 16 points to the letter "G", hand 4 will point to the word "Go". At the same time the recess 12 will be located back of said word so that light rays can pass through the openings forming the letters of the word. The lamp carried by the hand 4 constitutes a tail light. It will be seen that the structure is very simple, durable and efficient and can be applied readily. Shaft 8 can be located wherever desired and the various parts of the mechanism can of course be so proportioned and located as not to be exposed or be in the way of any of the mechanism of the machine.

What is claimed is:—

The combination with a spare tire holder having illuminated characters, of an indicator movably mounted on said holder, a tail light carried by the indicator, a shaft connected to and adapted to rotate the indicator, a dial, means movable relative to the dial for indicating predetermined characters on the tire holder, and mechanism for transmitting motion from said movable means to the shaft.

In testimony that I claim the foregoing as my own, I have hereto affixed my signature in the presence of two witnesses.

GEORGE L. CANTWELL.

Witnesses:
    D. P. SIMSON,
    C. A. MATSON.